(12) United States Patent
Wei et al.

(10) Patent No.: US 12,467,863 B2
(45) Date of Patent: Nov. 11, 2025

(54) DETECTION METHOD AND DETECTION SYSTEM USING LOCAL SURFACE PLASMON RESONANCE (LSPR) SPECTRAL IMAGE BRIGHTNESS CONTRAST

(71) Applicant: ACADEMIA SINICA, Taipei (TW)

(72) Inventors: Pei-Kuen Wei, Taipei (TW);
Sheng-Hann Wang, Chaozhou Township, Pingtung County (TW);
Ting-Wei Chang, New Taipei (TW)

(73) Assignee: ACADEMIA SINICA, Taipei (TW)

( * ) Notice: Subject to any disclaimer, the term of this patent is extended or adjusted under 35 U.S.C. 154(b) by 456 days.

(21) Appl. No.: 18/084,997

(22) Filed: Dec. 20, 2022

(65) Prior Publication Data

US 2023/0204508 A1 Jun. 29, 2023

Related U.S. Application Data

(60) Provisional application No. 63/266,037, filed on Dec. 27, 2021.

(51) Int. Cl.
*G01N 21/552* (2014.01)
*G01N 21/17* (2006.01)

(52) U.S. Cl.
CPC ..... *G01N 21/554* (2013.01); *G01N 2021/177* (2013.01)

(58) Field of Classification Search
None
See application file for complete search history.

(56) References Cited

U.S. PATENT DOCUMENTS

| | | | |
|---|---|---|---|
| 2014/0093977 A1* | 4/2014 | Raphael | G01N 21/554 422/69 |
| 2015/0247846 A1* | 9/2015 | Gerion | G01N 21/554 702/19 |
| 2016/0033410 A1* | 2/2016 | Ja | G01N 21/6428 436/171 |
| 2022/0011228 A1 | 1/2022 | Wei et al. | |

* cited by examiner

*Primary Examiner* — Thomas D Lee
(74) *Attorney, Agent, or Firm* — MUNCY, GEISSLER, OLDS & LOWE, P.C.

(57) ABSTRACT

A detection method and a detection system for detecting objects of interest attached to a surface of a plurality of reporters, wherein the plurality of reporters are flowing in a microfluidic chip and illuminated by a light source. The detection method has following steps: obtaining a plurality of local surface plasmon resonance (LSPR) spectral images of each the plurality of the reporters individually, wherein each of the LSPR spectral images has a brightness of a long wavelength band ($B_A$) and a brightness of a short wavelength band ($B_B$); calculating a spectral image brightness contrast $\gamma$ for each of the LSPR spectral images, wherein $$\gamma = \frac{B_A - B_B}{B_A + B_B};$$

and, defining a positive threshold for $|\gamma| \geq 0.1$.

17 Claims, 17 Drawing Sheets

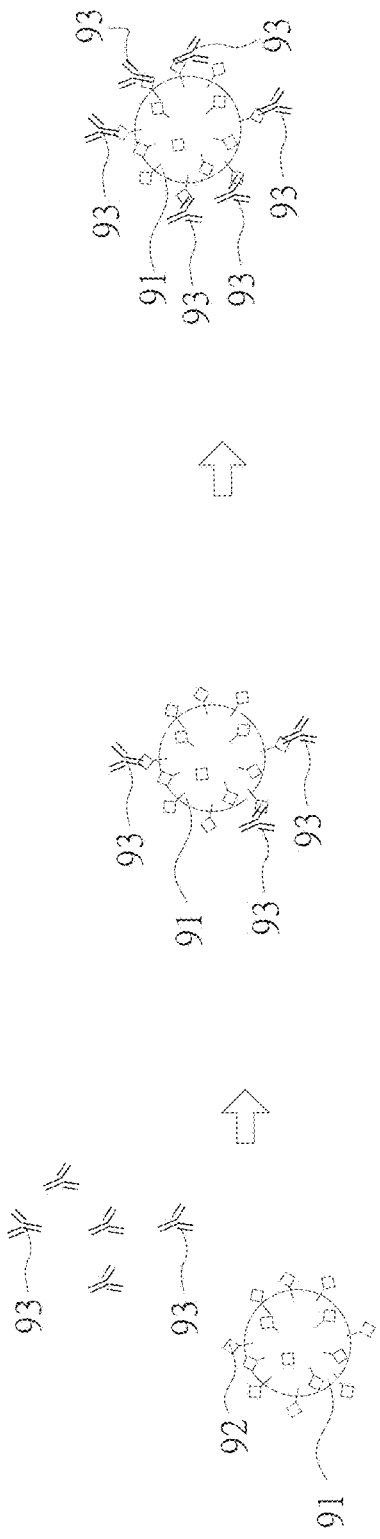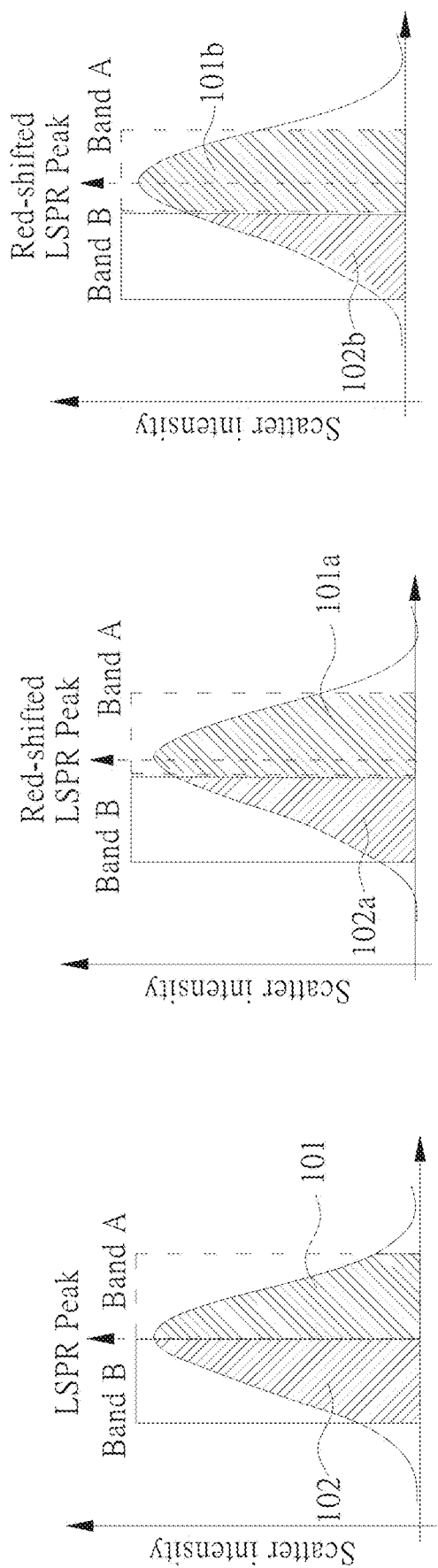
FIG. 2A
FIG. 2B

| Sample | Green Tea | | | |
|---|---|---|---|---|
| | Blank | Sample 1 | Sample 2 | Sample 3 |
| Imidacloprid | N.D. | 180 | 160 | N.D. |
| Dinotefuran | | N.D. | N.D. | |
| Acetamiprid | | | | |
| Fipronil | | | | |
| Acephate | | | | 320 |
| Chlopyrifos | | | | 120 |

| Sample | Black Tea | | | |
| --- | --- | --- | --- | --- |
| | Blank | Sample 1 | Sample 2 | Sample 3 |
| Imidacloprid | N.D. | 220 | 270 | N.D. |
| Dinotefuran | | 320 | 310 | |
| Acetamiprid | | 150 | 220 | |
| Fipronil | | N.D. | 157 | 398 |
| Acephate | | | 210 | 640 |
| Chlopyrifos | | | 100 | 100 |

DETECTION METHOD AND DETECTION SYSTEM USING LOCAL SURFACE PLASMON RESONANCE (LSPR) SPECTRAL IMAGE BRIGHTNESS CONTRAST

CROSS REFERENCE TO RELATED APPLICATIONS

This application claims priority of U.S. Provisional Application No. 63/266,037 filed on Dec. 27, 2021 under 35 U.S.C. § 119 (e), the entire contents of which are hereby incorporated by reference.

BACKGROUND

1. Technical Field

The present disclosure is related a detection method and a detection system, specifically to a detection method and a detection system for detecting of objects of interest by comparing a brightness of local surface plasmon resonance (hereinafter referred to as LSPR) spectral images obtained from a local surface plasmon resonance immunoassay.

2. Description of the Related Art

Local surface plasmon resonance (LSPR) is a particular surface plasmon resonance triggered by electromagnetic illumination. A coherent oscillation of free electrons occurs on the surface of plasmonic nanoparticles (hereinafter referred to as NPs), such as gold and silver nanoparticles (Au, Ag NPs). As shown in FIG. 1, P1 refers to the objects of interest 93 (such as antibody) are not attached to the anchor protein 92 on the surface of reporter 91 (such as Au, Ag NPs) and P2 refers to the objects of interest 93 are attached to the anchor protein 92 on the surface of reporter 91. As shown in FIG. 1, the LSPR of reporter 91 shows a resonance peak in the visible wavelength regime, noticeable light scattering or absorption is present. Additionally, the peak resonance wavelength is related to the surface refractive index of plasmonic NPs. This indicates that once objects of interest 93 (antibody) attach to the surface of the plasmonic reporter 91, the LSPR peak shifts (typically a redshift). Thus, local surface plasmon resonance can be used as a label-free ruler to quantify objects of interest 93. Plasmonic NPs have been widely used for biomolecular sensing, such as for antigens and antibodies, due to these unique properties. They are also well known as LSPR immunoassays for the detection of various diseases.

There are different LSPR immunoassays that are primarily based on the two conventional methods; i.e. UV-visible absorption spectrum (hereinafter referred to as UV-Vis) detection and colorimetric detection, including naked-eyed and lateral flow assays (hereinafter referred to as LFAs). UV-Vis methods employ absorption spectra to evaluate objects of interest such as biomolecule binding according to the LSPR peak shift of monodispersed NPs. However, the peak shift in UV-Vis methods is tiny, and the limit of detection (hereinafter referred to as LOD) is restricted mainly by the low figure of merit (hereinafter referred to as FoM) of the LSPR sensor applied on the LSPR immunoassay.

On the other hand, the naked eye and LFA methods detect objects of interest based on the intense color change induced by the aggregation of NPs either in the liquid phase or on test papers. Although the naked eye and LFA methods are simple, high user-friendly, and low cost, it requires a high level of objects of interest loaded on reporters to present significant color changes. Considering the number of objects of interest 93 loaded on each reporter 91, UV-Vis results in an inferior LOD (ng to µg mL$^{-1}$) if there is no other signal or objects of interest amplification. It is challenging to not only improving in sensitivity of current LSPR immunoassays, but pushing the boundary of the current LOD is also a major challenge of current LSPR immunoassays detection. Thus, there is a need to provide a detection method and system to improve sensitivity and has increased boundary of the LOD for LSPR immunoassays.

SUMMARY

In view of the problems mentioned above, the present disclosure provides a detection method and a detection system for detecting of objects of interest by comparing a brightness of local surface plasmon resonance spectral images obtained from a local surface plasmon resonance immunoassay to improve detecting sensitivity and the limit of detection of the objects of interest.

To achieve the above objective, the present disclosure provides a detection method for detecting objects of interest attached to a surface of a plurality of reporters, wherein the plurality of reporters are flowing in a microfluidic chip and illuminated by a light source, the method has following steps: obtaining a plurality of local surface plasmon resonance (LSPR) spectral images of each of the plurality of the reporters individually, wherein each of the LSPR spectral images has a brightness of a long wavelength band ($B_A$) and a brightness of a short wavelength band ($B_B$); calculating a spectral image brightness contrast γ for each of the reporters, wherein $$\gamma = \frac{B_A - B_B}{B_A + B_B};$$

and, defining a positive threshold for |γ|≥0.1.

According to an embodiment of the present disclosure, when a molecular weight of the objects of interest is larger than 10 kDa, the positive threshold is for γ≥0.1.

According to an embodiment of the present disclosure, when a molecular weight of the objects of interest is smaller than 500 Da, the positive threshold is for −γ≥0.1.

According to an embodiment of the present disclosure, the long wavelength band and the short wavelength band are divided by a peak of a LSPR spectral image of the reporter before being shifted.

According to an embodiment of the present disclosure, the peak of a LSPR spectral image of the reporter before being shifted is X nm, the long wavelength band is defined as (X+10)±10; the short wavelength band is defined as (X−10)±10.

According to an embodiment of the present disclosure, before defining the positive threshold, the method further has following step: defining a diagram of each of the spectral image brightness contrast γ and a counting number of the reporters corresponding to each of the spectral image brightness contrast γ.

According to an embodiment of the present disclosure, the objects of interest attached to the surface of a plurality of reporters via a plurality of immuno-agents, and a concentration of the plurality of immuno-agents is 20%.

According to an embodiment of the present disclosure, the light source is a dark-field illumination system.

To achieve the above objective, the present disclosure provides a detection system for detecting objects of interest attached to a surface of a plurality of reporters, wherein the plurality of reporters are flowing in a microfluidic chip and illuminated by a light source, the system including: an image capture device and a processor electrically connected to the image capture device. The image capture device is for obtaining a plurality of local surface plasmon resonance (LSPR) spectral images of each of the plurality of the reporters individually, wherein each of the LSPR spectral images has a brightness of a long wavelength band ($B_A$) and a brightness of a short wavelength band ($B_B$). The processor calculates a spectral image brightness contrast γ for each of the reporters, $$\gamma = \frac{B_A - B_B}{B_A + B_B}$$

and the processor defines a positive threshold for |γ|≥0.1.

According to an embodiment of the present disclosure, the image capture device is a camera installed in a hand-held device.

To sum up, the main concept of the detection method and a detection system of the present disclosure is based on comparing the brightness in the scattering image of individual AuNPs within two selected wavelength regions to amplify the signal difference between the two selected wavelength regions and then to improve detecting sensitivity and the limit of detection of the objects of interest.

BRIEF DESCRIPTION OF THE DRAWINGS

FIG. 2A illustrates a schematic diagram of the anchor-protein-modified reporters before and after objects of interest (anti-body) binding;

FIG. 2B illustrates the scattering spectra in response to reporters in FIG. 2A;

Figures 3A, 3B:
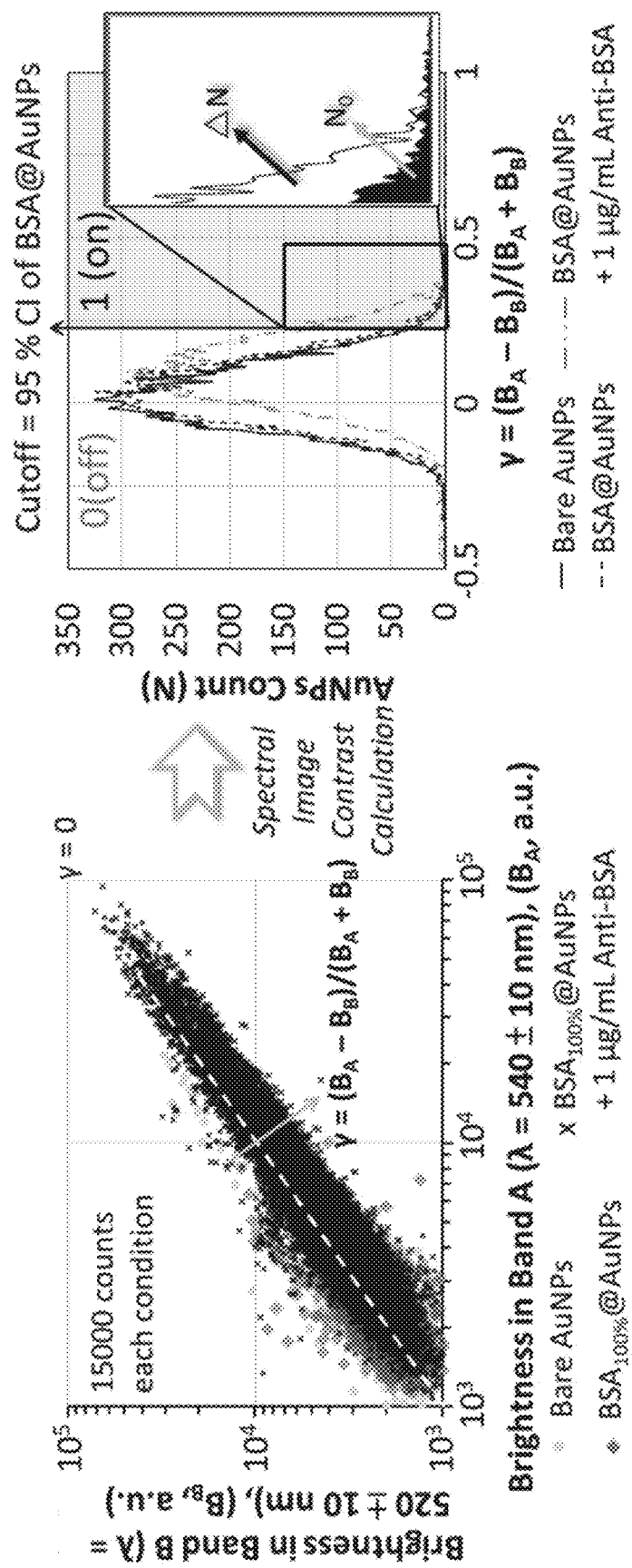
FIG. 3A illustrates the brightness scatter plot of the bare reporters (AuNPs, gray dots) and the BSA-modified reporters (BSA$_{100\%}$@AuNPs) before (gray diamonds) and after (black crosses) anti-BSA conjugation obtained by the present disclosure.
FIG. 3B illustrates reporter (AuNP) counts versus spectral image brightness contrast $$\gamma = \frac{B_A - B_B}{B_A + B_B}$$
Figures 4A, 4B:
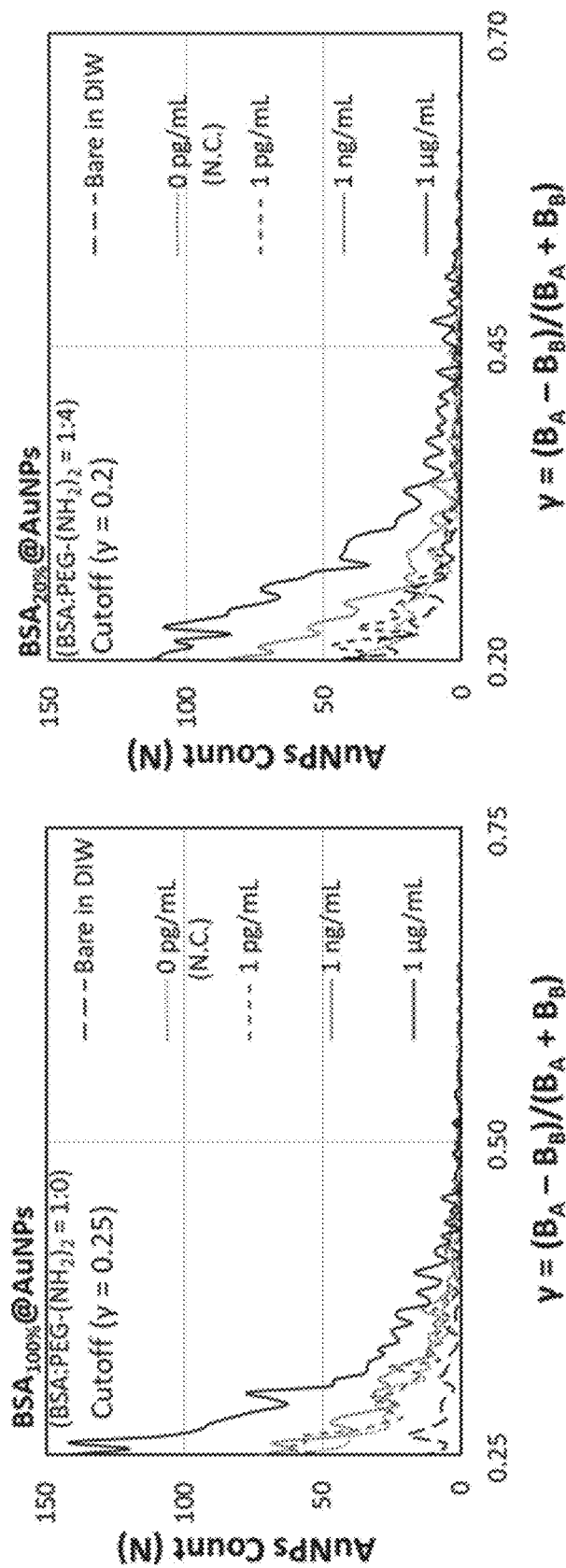
Figures 4C, 4D:
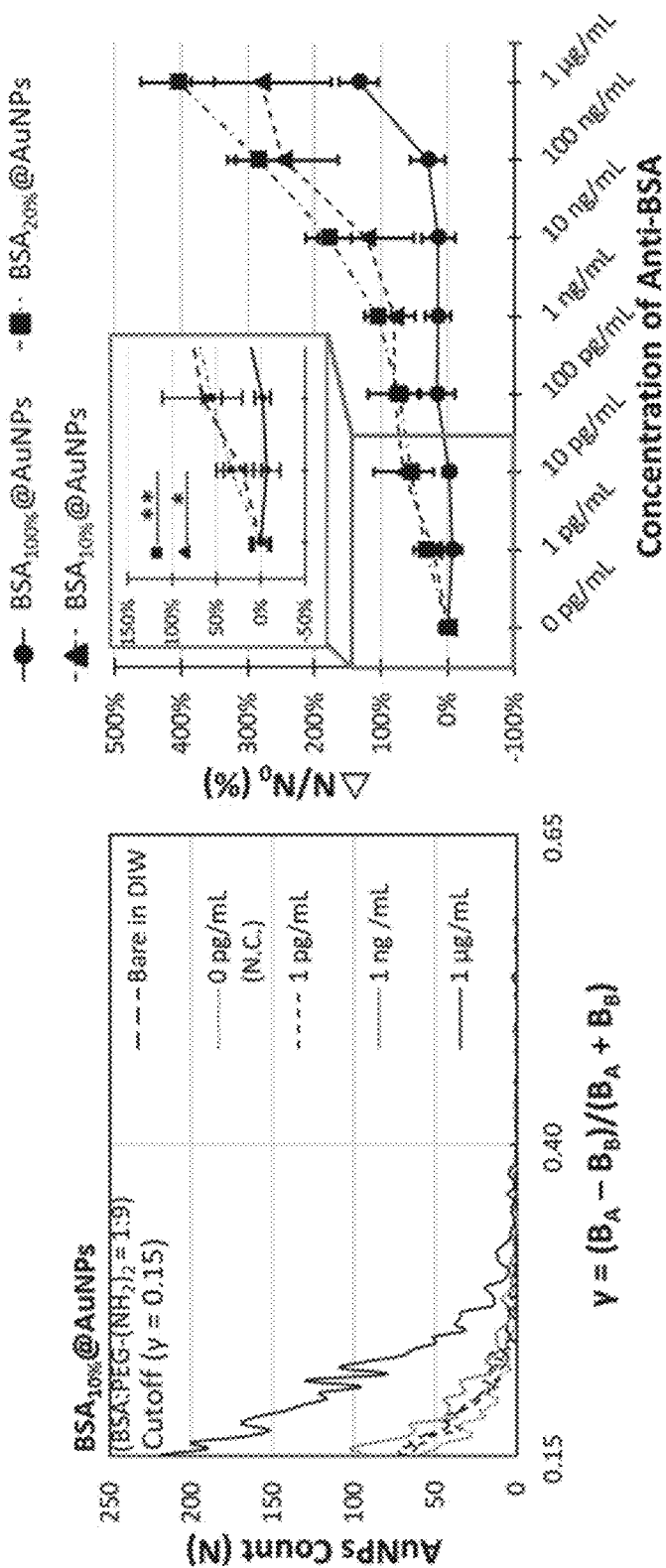
Figure 5A:
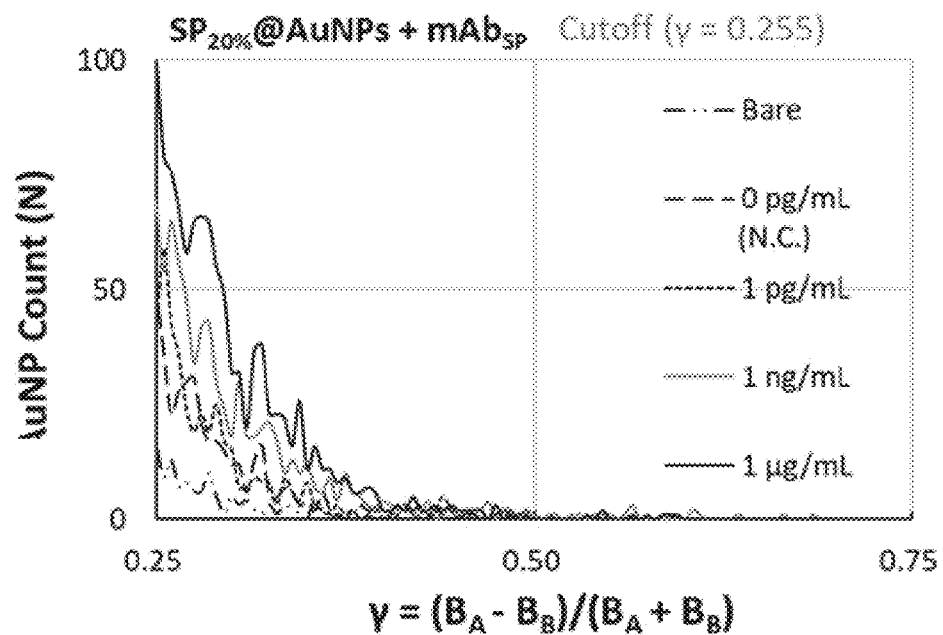
Figure 5B:
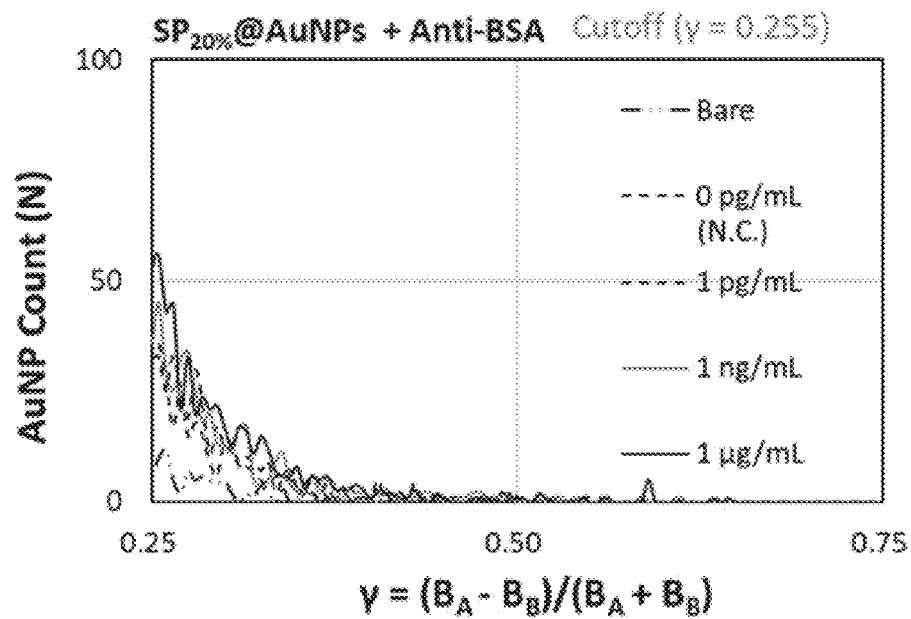
Figure 5C:
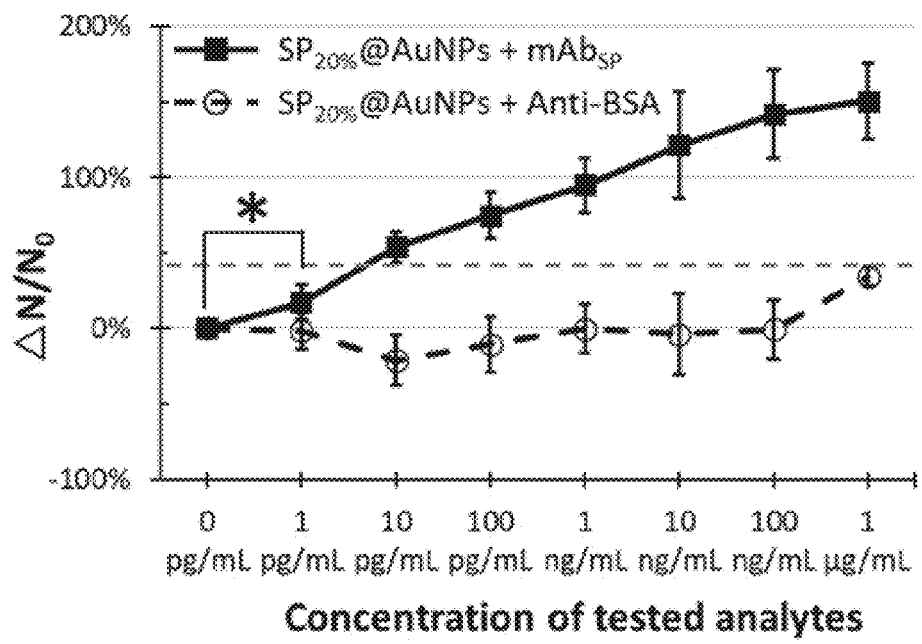
Figure 5D:
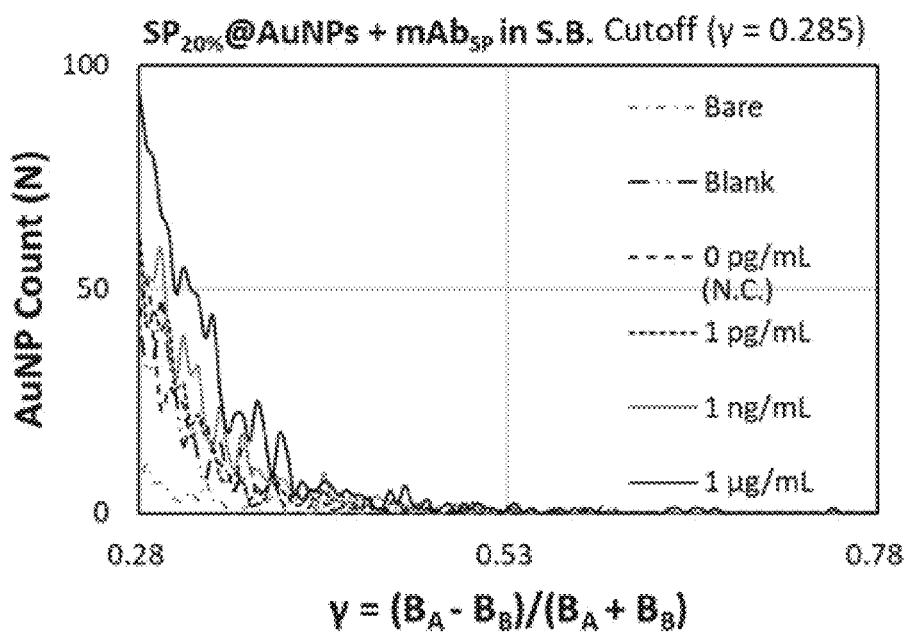

distribution extracted from FIG. 3A;

FIG. 4A illustrates reporter (AuNP) counts versus spectral image brightness contrast $$\gamma = \frac{B_A - B_B}{B_A + B_B}$$

distributions of BSA$_{100\%}$@AuNPs conjugated with different concentrations of anti-BSA;

FIG. 4B illustrates AuNP counts versus spectral image brightness contrast $$\gamma = \frac{B_A - B_B}{B_A + B_B}$$

distributions of BSA$_{20\%}$@AuNPs conjugated with different concentrations of anti-BSA;

FIG. 4C illustrates reporter (AuNP) counts versus spectral image brightness contrast $$\gamma = \frac{B_A - B_B}{B_A + B_B}$$

distributions of BSA$_{10\%}$@AuNPs conjugated with different concentrations of anti-BSA;

FIG. 4D illustrates ΔN/N$_0$ signals in response to various concentrations of anti-BSA conjugated to BSA$_{100\%}$@AuNPs, BSA$_{20\%}$@AuNPs, and BSA$_{10\%}$@AuNPs;

FIG. 5A illustrates reporter (AuNP) counts versus spectral image brightness contrast γ distributions of SP$_{20\%}$@AuNPs conjugated with different concentrations of mAb$_{SP}$;

FIG. 5B illustrates reporter (AuNP) counts versus spectral image brightness contrast γ distributions of SP$_{20\%}$@AuNPs conjugated with different concentrations of anti-BSA in TE buffer;

FIG. 5C illustrates the readout signals ΔN/N$_0$ in response to mAb$_{SP}$ and anti-BSA obtained by the present disclosure. The broken lines indicate the readout signal of LOD;

FIG. 5D illustrates reporter (AuNP) counts versus spectral image brightness contrast γ distributions of SP$_{20\%}$@AuNPs conjugated with different concentrations of mAb$_{SP}$ in artificial saliva (without any additive proteins, blank) and saliva buffer (S.B.) that contains HSA, IgA, IgG, and IgM.

Figure 5E:
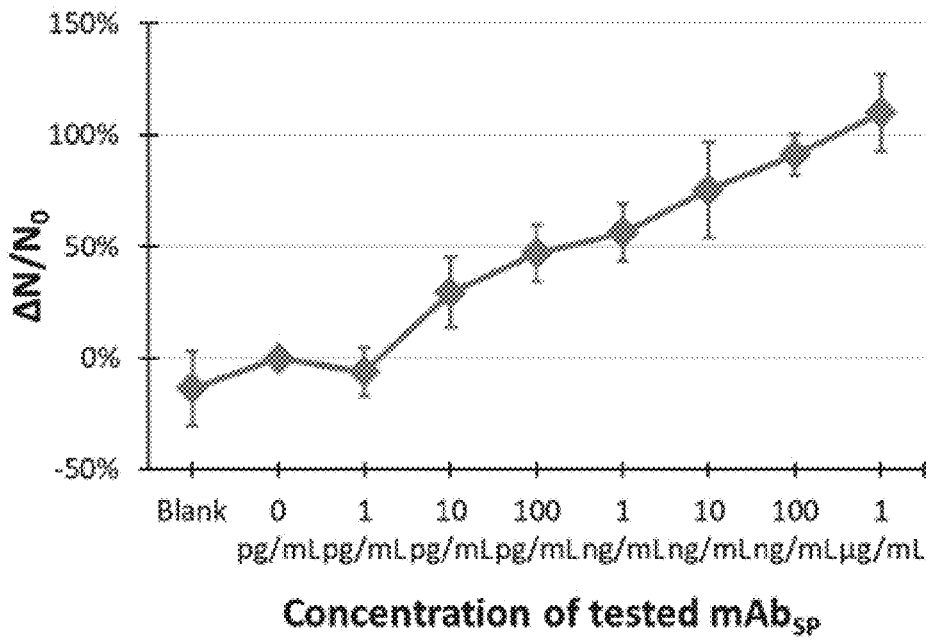
Figure 6A:
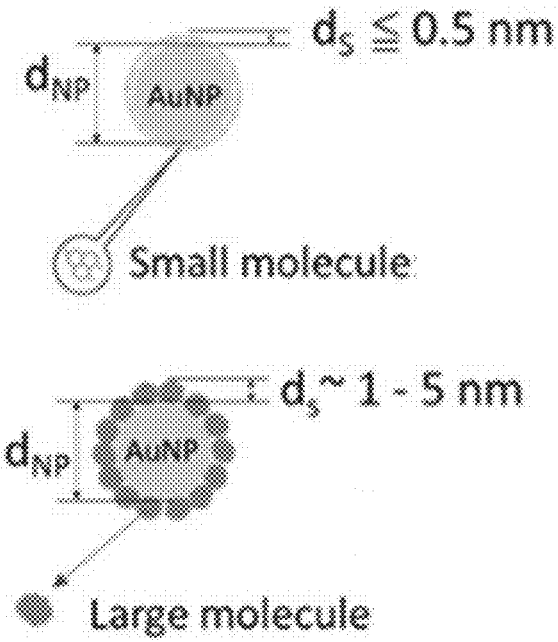
Figure 6B:
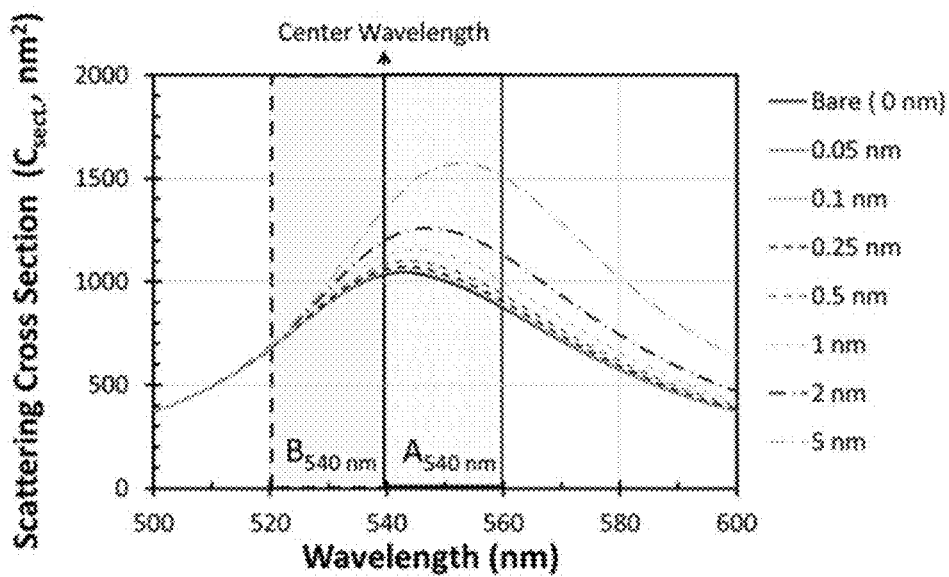
Figure 6C:
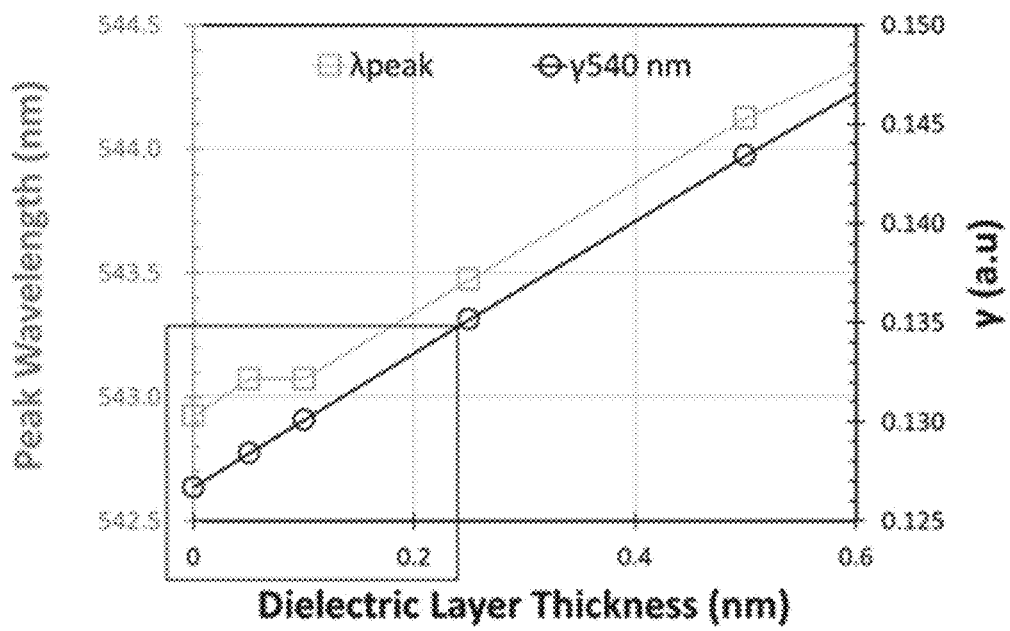
Figure 6D:
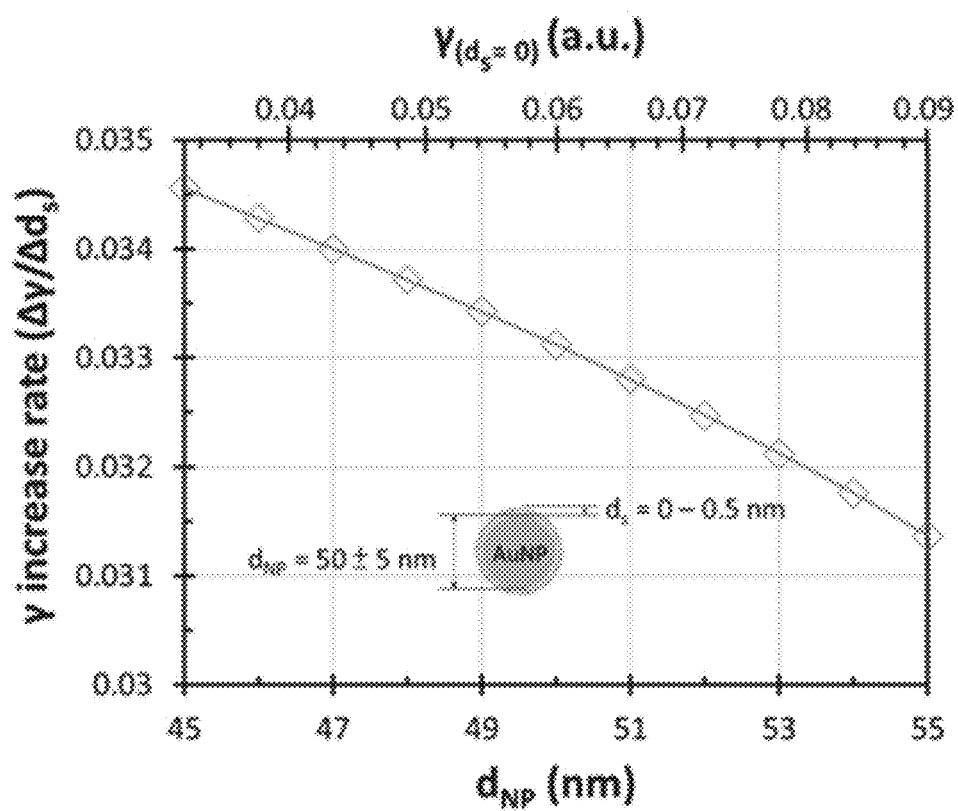
Figure 7A:
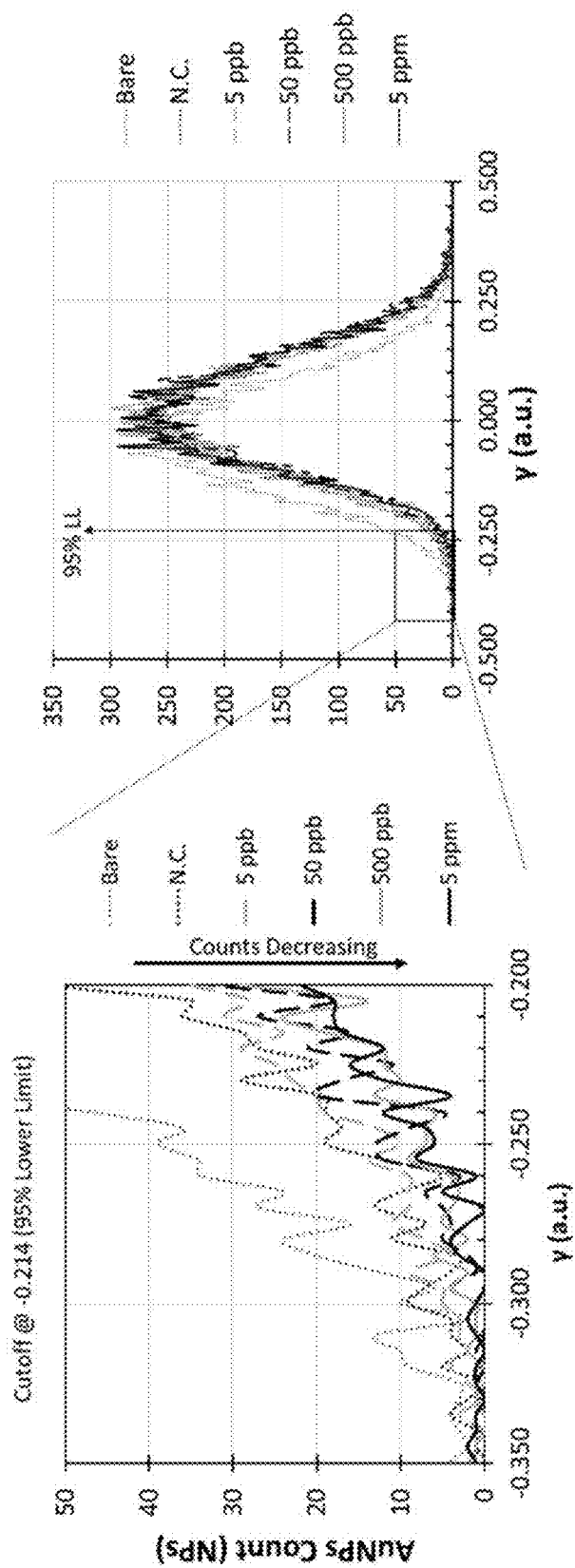
Figure 7B:
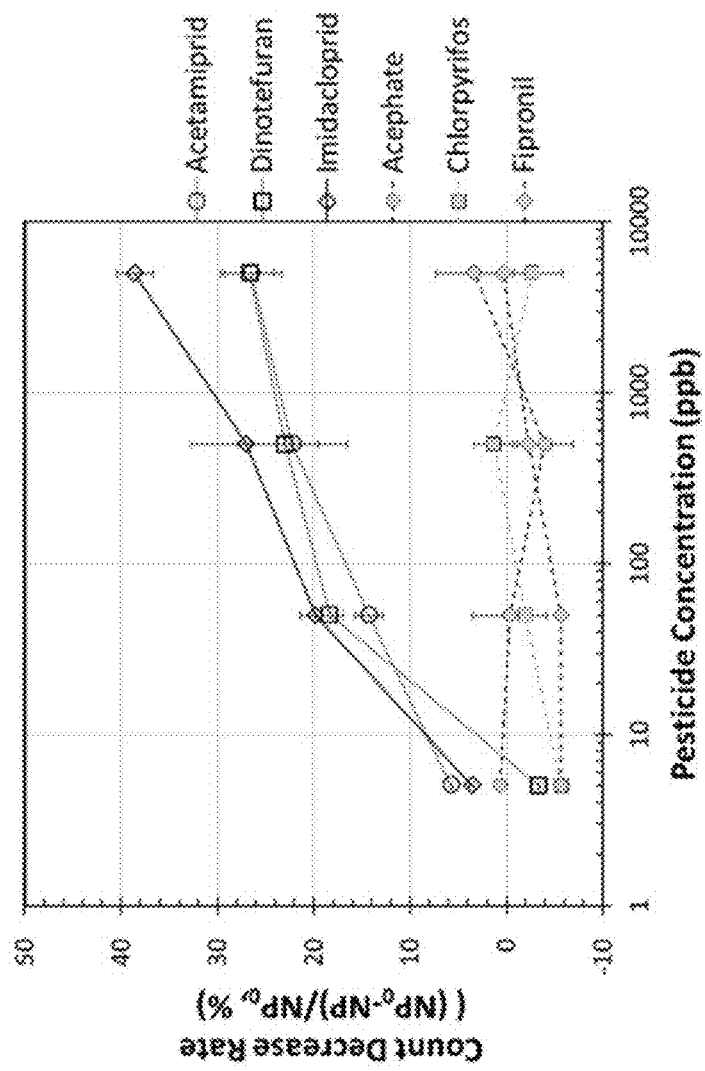
Figures 8A, 8B:
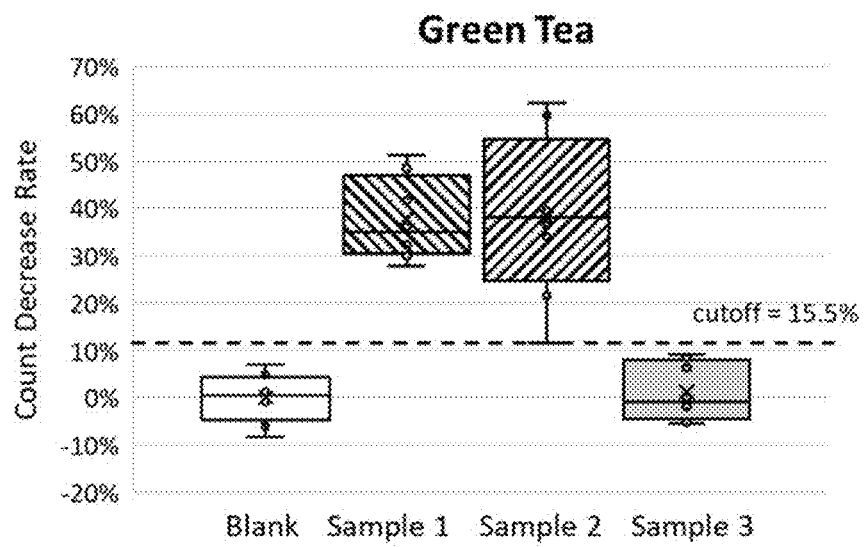
Figures 8C, 8D:
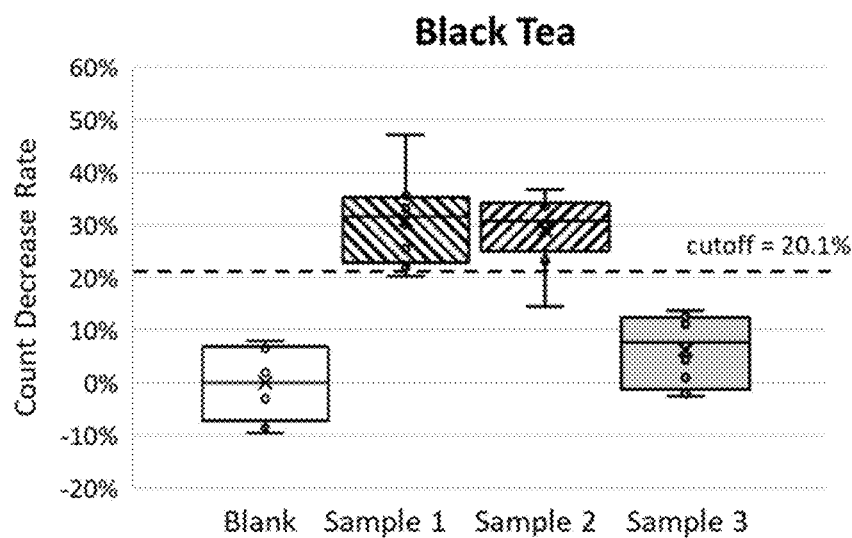

FIG. 5E illustrates the statistic ΔN/N$_0$ in response to the mAb$_{SP}$;

FIG. 6A is an illustration of small objects of interest and large objects of interest bound on reporters (AuNPs), where the d$_s$ indicates the thickness of the bound molecule layer of the objects of interest, and d$_{NP}$ indicates the diameter of the reporters (AuNPs);

FIG. 6B illustrates the normalized scattering cross-sections of reporters (AuNPs) with 50 nm in diameter (d$_{NP}$) versus different ds. The legend indicates the thickness of the bound molecule layer (d$_s$);

FIG. 6C illustrates the responses comparison along with d$_{NP}$ by using the peak wavelength and spectral image brightness contrast γ centered at 540 nm;

FIG. 6D illustrates 10% of the coefficient of diameter variation, reporter (AuNP) have a ±5 nm in diameter variation;

FIG. 7A is an illustration of the positive threshold m at the 95% lower limit (LL) of the confidence interval (CI) shows a gradual decrease along with the pesticide concentration increases;

FIG. 7B is an illustration based on the 95% LL decrease rate and the use of the odorant-binding-protein-2 modified reporters (AuNPs), this disclosure provides a significant sensitivity in neonicotinoids and evidently selectivity from other classes of pesticides, such as acephate and fipronil;

FIG. 8A is an illustration of blind test results of green tea detected by the detection method of present disclosure;

FIG. 8B is a standard method—ESI-mass spectrometry result of the blind test results of green tea;

FIG. 8C is an illustration of blind test results of black tea detected by the detection method of present disclosure; and FIG. 8D is a standard method—ESI-mass spectrometry result of the blind test results of black tea.

DETAILED DESCRIPTION OF THE EMBODIMENTS

In order to make the structure and characteristics as well as the effectiveness of the present disclosure further understood and recognized, a detailed description of the present disclosure is provided as follows, along with embodiments and accompanying figures.

Figure 2C:
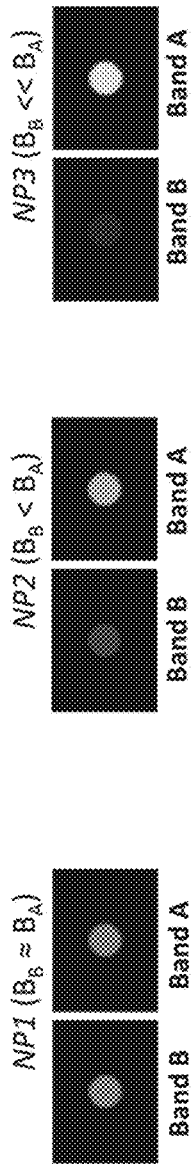
FIG. 2C illustrates the scattering images in response to reporters in FIG. 2A.

Please refer to FIG. 2A to FIG. 2E. As shown in FIG. 2A and FIG. 2B, the detection method and detection system of the present disclosure are detecting objects of interest 93 attached to a surface of a plurality of reporters 91, more specifically detecting of the objects of interest 93 attached to the anchor protein 92 on the surface of reporter 91. According to one embodiment of the present disclosure, objects of interest 93 can be antibody, antigen, spike protein, pesticides or acephate and fipronil. The reporter 91 can be gold nanoparticles or silver nanoparticles.

It is noted that the detection of the objects of interest 93 attached to the anchor protein 92 on the surface of reporter 91 is primarily based on its LPSR peak shift in the spectrum caused by the objects of interest 93 attaching to the surface of reporter 91 and its consequent surface refractive index increasing, as schematically shown in FIG. 2A and FIG. 2B. However, the low FoM of LSPR leads to a very low wavelength sensitivity in detection. When the LSPR peak as the center in the scattering spectra and select two wavelength bands (long wavelength band A and short wavelength band B) adjacent to the peak center, as shown in FIG. 2B, along with the LSPR shift, the areas 102, 102a, 102b and 101, 101a, 101b in these two bands also changed. It increased in long wavelength band A (101, 101a, 101b) and decreased in short wavelength band B (102, 102a, 102b), and it is clearly shown in FIG. 2B that the area changes between long wavelength band A and short wavelength band B was much more intense than the LSPR peak shift. This indicates that using the area change in spectra can amplify the LSPR shift readout to an extent. It is noted that, according to one embodiment of the present disclosure, assuming the peak of a LSPR spectral image of the reporter before being shifted is X nm, the long wavelength band A is defined as $(X+10)\pm 10$; the short wavelength band B is defined as $(X-10)\pm 10$.

Figure 2D:
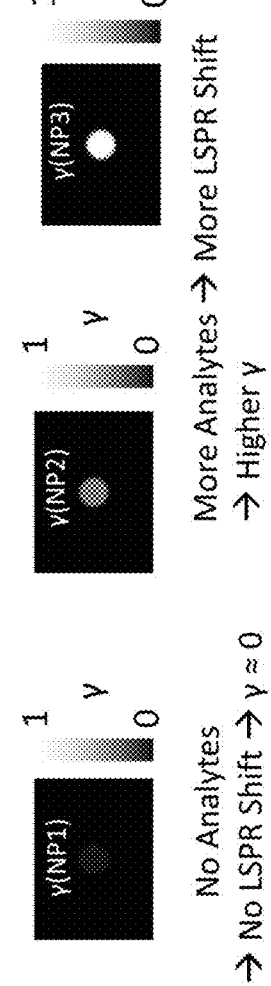
FIG. 2D illustrates spectral image contrasts of different reporters according to the scatter brightness in FIG. 2C.

As shown in FIG. 2C and FIG. 2D, when the spectra are projected as scattering images, the area is represented by scattering brightness. FIG. 2C and FIG. 2D also depicts the brightness change in the scattering images following the objects of interest 93 attaching to reporter 91 (AuNPs) and their corresponding spectral changes. At the beginning (NP$_1$), the scattered LSPR peak of the AuNPs (reporter 91) is close to the border between the two segmental wavelength bands. Its areas in scatter spectra are approximated. When presented as the scatter images filtered by these two selected wavelength bands (long wavelength band A and short wavelength band B), it shows a similar brightness. As the objects of interest 93 are binding (NP$_2$ and NP$_3$), the LSPR peak redshifts and thus presents a much brighter scatter in band A than B, and the brightness is also related to the binding number of the objects of interest 93. Based on the brightness change in scattering images, the spectral image brightness contrast γ is derived.

$$\gamma(NP(i)) = \frac{B_A(NP(i)) - B_B(NP(i))}{B_A(NP(i)) + B_B(NP(i))}$$

$B_A(NP(i))$ and $B_B(NP(i))$ are the scattering brightness in long wavelength band A and short wavelength band B of the reporter 91 (AuNP) NP(i), respectively. γ is the spectral image brightness contrast and i is the counting number of the AuNP (reporter 91). Generally, as the LSPR redshifts, the brightness from long wavelength band A ($B_A$) increases while the brightness from short wavelength band B ($B_B$) decreases. As a result, the contrast change, $$\gamma = \frac{B_A - B_B}{B_A + B_B}$$

shows a much larger increase than the change of the LSPR peak shift. The difference, $B_A - B_B$, indicates the analogous spectral contrast related to the LSPR peak shift, which amplifies the brightness change. Normalization to ($B_A + B_B$) is employed to eliminate the intensity fluctuation from light scattering. As a result, γ is close to 0 at the beginning (NP1) and increases as analytes bind (NP2 and NP3), as shown in FIG. 2D. Overall, the spectral image brightness contrast weights and amplifies the LSPR shift readout and provides a quick spectral evaluation in the LSPR immunoassay of applying AuNPs as reporter 91.

The spectral brightness contrast method applied in present disclosure can easily be combined with a CCD to quickly evaluate LSPR shifts of individual gold nanoparticles, which offers outstanding peak wavelength linearity, high wavelength resolution, fast response time, and a simple optical system. This capability also facilitates the examination of flowing reporter 91 (AuNPs) in microfluidic chip 120 shown in FIG. 2E, which provides the potential to simply sample and collect thousands of data points in a short time while requiring quick data analysis.

Figure 1:
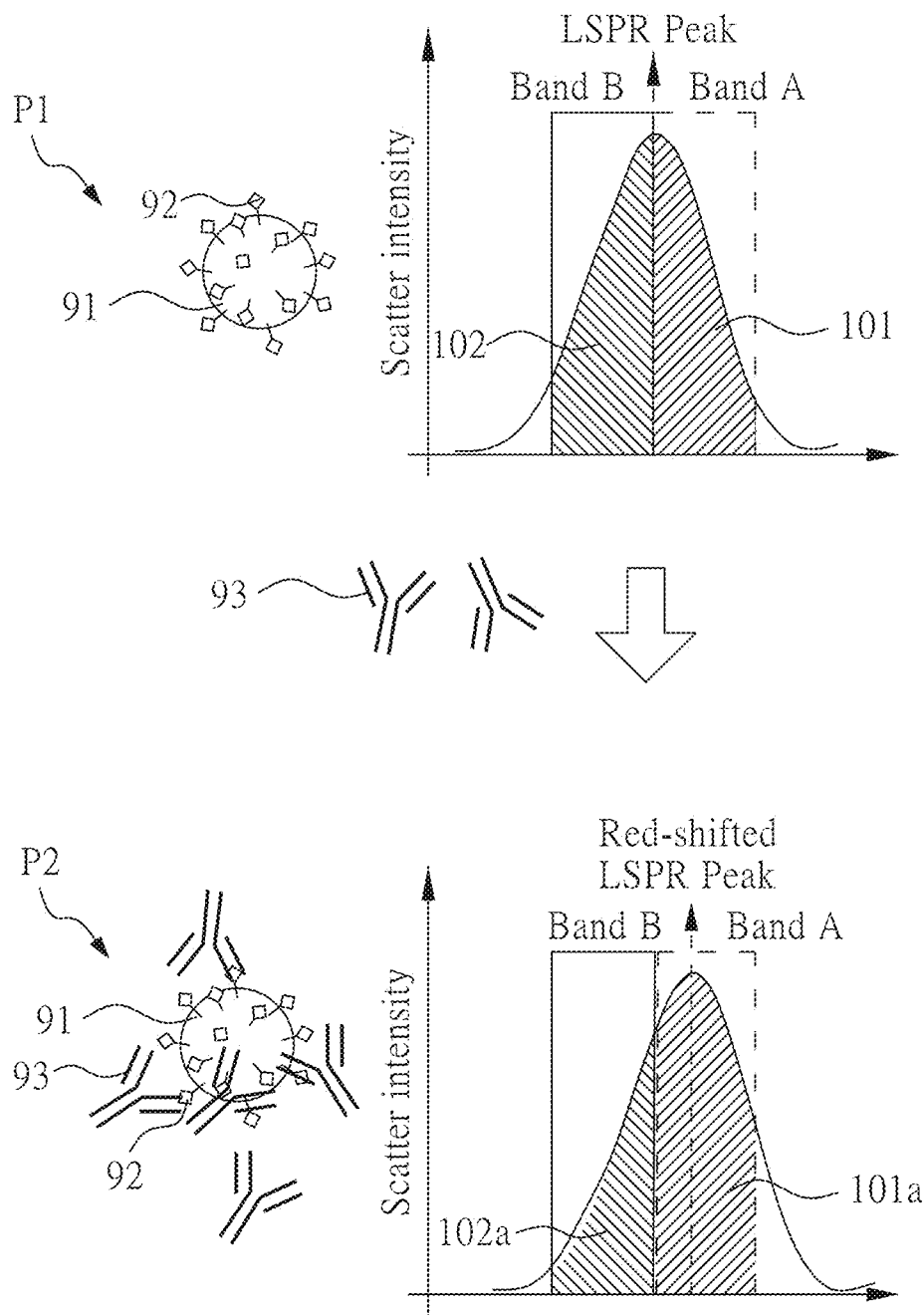
FIG. 1 illustrates a schematic scattering spectra obtained from the conventional a local surface plasmon resonance immunoassay.

Moreover, in the traditional LSPR immunoassay as shown in FIG. 1, the signal is an averaged output of an assembly of AuNPs. Thus, some detected positive signals could be masked by the average signal, and it is difficult to cross the threshold for a minimum detectable signal. The detection method and system take advantage of binary decisions to provide a much higher signal-to-noise (S/N) ratio and lower LOD. However, examination of a massive number of data points is also necessary for digital detection to filter out the low number of positive signals at such a low rate. Using spectral image brightness contrast γ and microfluidic channels, the detection method and system of present disclosure analysis of AuNPs can be realized.

To verify the capability, we compared the LOD of antibody detection to that of the other two conventional LSPR immunoassay methods, UV-V$_{is}$ and naked-eyed assays. Within the integration of LSPR immunoassay, the detection method and system, and microfluidic system, the present disclosure has an LOD of 1 pg mL$^{-1}$ for anti-BSA, four to seven orders of magnitude lower than that of UV-V$_{is}$ and naked-eyed assays. Antibodies against the spike protein of SARSCoV-2 in artificial saliva supplemented with various human proteins and antibodies were also used to validate the sensitivity and specificity in complicated samples. The result shows an LOD of 10 pg mL$^{-1}$ and a broad six order-of-magnitude dynamic range. The apparent data discrimination from 0 pg mL$^{-1}$ further demonstrates the outstanding sensitivity of the present disclosure in complicated samples. Although the LOD raises in complicated samples, the developed present disclosure still presents the same LOD grade (10 pg mL$^{-1}$) as ELISA while being label-free, much more accessible, and having a quicker detection time (<15 mins).

Figure 2E:
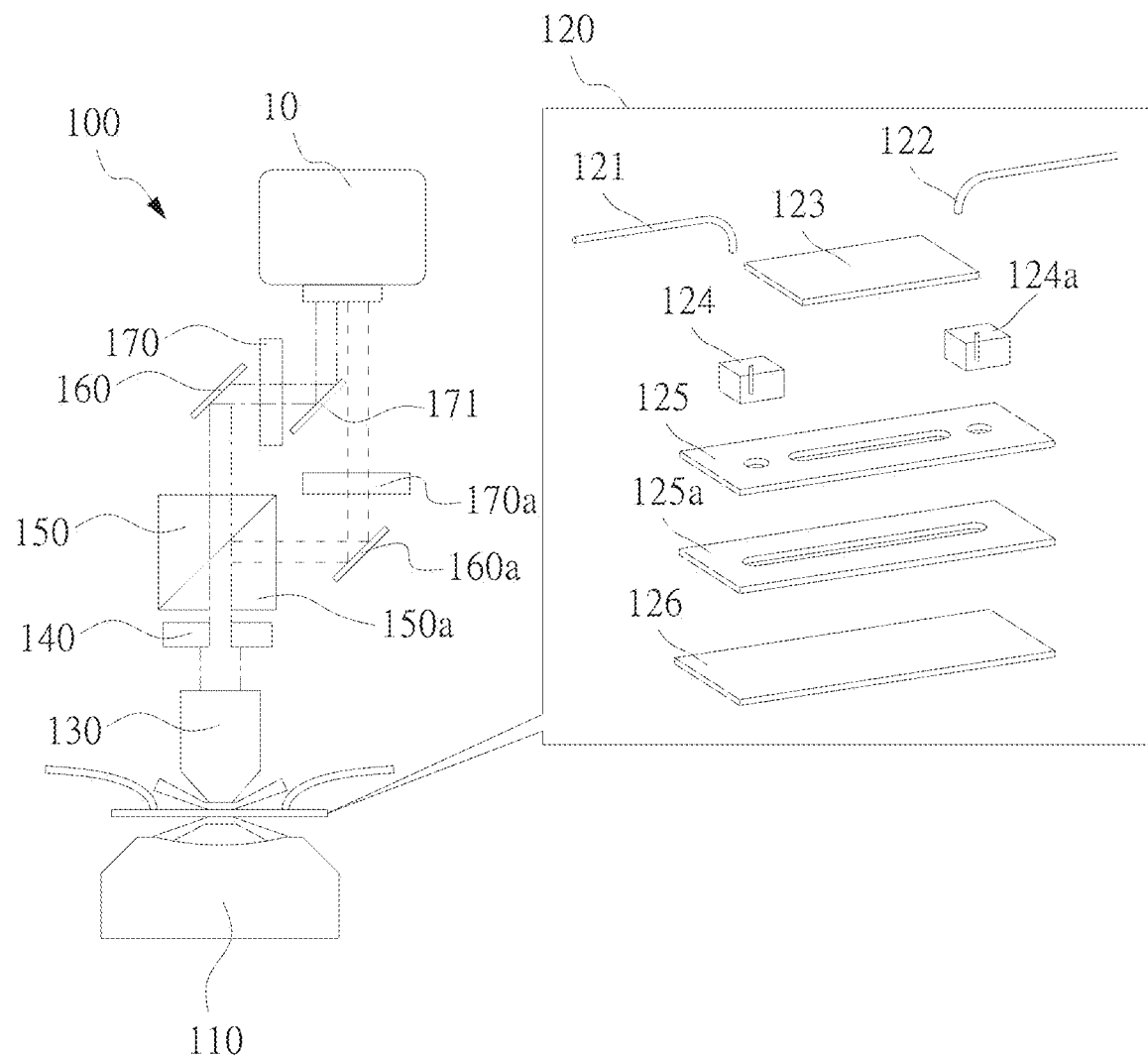
FIG. 2E illustrates a schematic diagram of an embodiment of the microfluidic chip and illuminated by a light source applied on the present disclosure.

As shown in FIG. 2E, the detection method and the detection system of the present disclosure is employed for detecting local surface plasmon resonance spectral images obtained from a local surface plasmon resonance immunoassay 100, wherein the local surface plasmon resonance immunoassay 100 comprises a light source 110, a microfluidic chip 120, objective lens 130, a slit 140, a short-pass dichroic mirror 150, 150a, reflective mirrors 160, 160a, 171, filters 170, 170a, and an image capture device 10a. In this embodiment, the light source 110 is a dark-field illumination system and the image capture device 10 is a scientific complementary metal-oxide-semiconductor (sCMOS) camera. The short-pass dichroic mirror 150, 150a is a 530 nm short-pass dichroic mirror for splitting the beam transmitted by the light source 110 into channel B and channel A shown in FIG. 2F and FIG. 2G. The beam transmits via the 530 nm short-pass dichroic mirror 150, the reflective mirror 160, the filter 170, the reflective mirror 171 to the image capture device 10 is presented as the short wavelength band B (102, 102a, 102b) in FIG. 2B. The beam transmits via the 530 nm short-pass dichroic mirror 150a, the reflective mirror 160s, the filter 170s to the image capture device 10 is presented as the long wavelength band A (101, 101a, 101b) in FIG. 2B.

As shown in FIG. 2E, first, the microfluidic chip 120 leads streamed reporter 91 (AuNPs) into a local surface plasmon resonance immunoassay 100 illuminated by the light source 110 (dark-field illumination system). The microfluidic chip 120 includes glass slide 126, cover glass 123, acrylic junctions 124, 124a, 3M double-sided tape 125, 125a, an inlet 121, an outlet 122. The glass slide 126, cover glass 123, acrylic junctions 124, 124a, and 3M double-sided tape 125, 125a were first treated with surface hydrophobic modification by vapor-phase deposition to prevent nonspecific binding from flowing reporter 91 (AuNPs). Briefly, glass slide 126, cover glass 123, acrylic junctions 124, 124a, and 3M double-sided tape 125, 125a were first put in a chamber together with one mL of trichloro (1H, 1H, 2H,2H-perfluorooctyl) silane (PTOCTS), and the chamber was then vacuumed sealed and kept at approximately 0.5 atm for 30 mins. glass slide 126, cover glass 123, acrylic junctions 124, 124a, and 3M double-sided tape 125, 125a were then baked at 120° C. for 1 hour to facilitate covalent binding between PTOCTS and glass. The glass slide 126, cover glass 123, acrylic junctions 124, 124a, and 3M double-sided tape 125, 125a were subsequently sealed and tubed, and the nature of the microchannels was defined by two layers of double-sided tape (3M, thickness=60 µm), as shown in FIG. 2E.

Figures 2F, 2G:
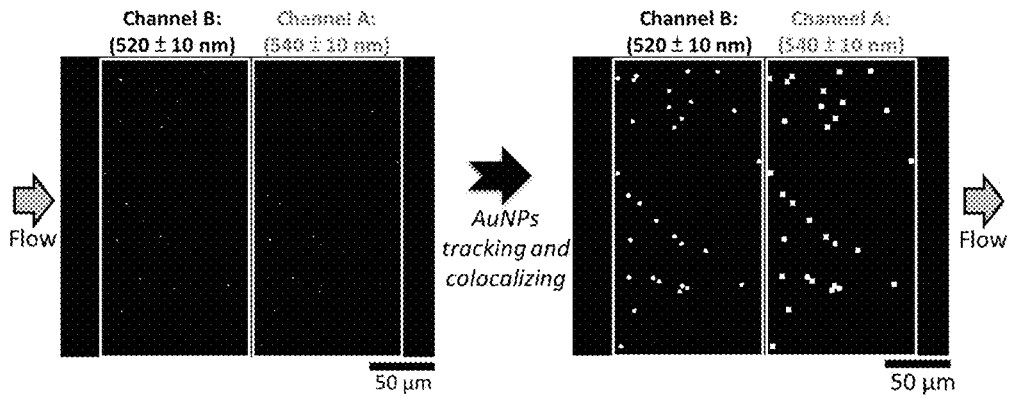
FIG. 2F and FIG. 2G illustrate schematic diagrams of tracing reporters flowing through the short wavelength band and the long wavelength band.
Figure 2H:
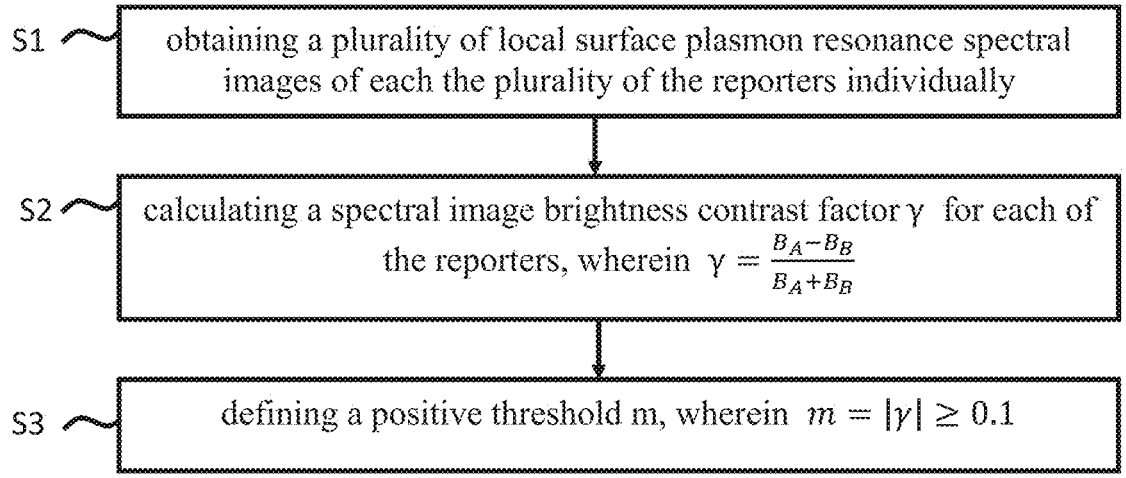
FIG. 2H illustrates a flow chart of one embodiment of the detection method.

Please refer to FIG. 2E to FIG. 2H. As shown in FIG. 2E and FIG. 2H, the detection method of the present disclosure includes step S1 to step S3.

Step S1: obtaining a plurality of local surface plasmon resonance (LSPR) spectral images of each the plurality of the reporters individually, wherein each of the LSPR spectral images has a brightness of a long wavelength band ($B_A$) and a brightness of a short wavelength band ($B_B$).

As shown in FIG. 2E, the microfluidic chip 120 in the local surface plasmon resonance immunoassay 100 illuminated by the light source 110 can quickly record the LSPR information of each reporter 91 (AuNPs) flowing in the microfluidic chip 120. The light source 110 in this embodiment is based on an Olympus upright microscope. A 60× (NA=0.7) air-type objective and a dark-field condenser (Cyto Viva) with a 20-Watts halide light source were used in this work. The reporter 91 (AuNPs) were drawn into the microfluidic chip 120 described above in the following experiments, and the light scattering of reporter 91 (AuNPs) was excited by dark-field illumination. The scattering was then passed through a 530-nm short-pass dichroic mirror, in which the cutoff is located at the peak of the LSPR scattering of the bare reporter 91 (AuNPs), and separated into two channels with two color bands (green and yellow) shown in FIG. 2F and FIG. 2G. Light in each channel was then passed through two bandpass filters to further extract significant bands of LSPR of AuNPs. The two filters used had non-overlapping neighboring filter bands, and the transmitted wavelength bands were 540±10 nm (filter A) and 520±10 nm (filter B). The LSPR spectra of reporter 91 (AuNPs) were transferred into intensity information using a dichroic mirror and two bandpass filters. They were quickly recorded as images by a scientific complementary metal-oxide-semiconductor (sCMOS) camera. FIG. 2F and FIG. 2G also show the actual scattering images of bare AuNPs in split parallel channels A and B, and the bright spots indicate single AuNPs. For data collection, AuNPs were first tracked in channel A (yellow circled) and co-localized in channel B (green circled), as shown in FIG. 2F and FIG. 2G. Meanwhile, the intensities of AuNPs in the parallel channels were also recorded for the following analysis.

Step S2: calculating a spectral image brightness contrast γ for each of the reporters, wherein $$\gamma = \frac{B_A - B_B}{B_A + B_B};$$

According to one embodiment of the present disclosure, as shown in FIG. 3A, the intensity scatter plot of the bare AuNPs and the BSA-modified AuNPs (BSA$_{100\%}$@AuNPs) before and after anti-BSA conjugation. Each dataset contains 15,000 data points, the detection time was less than 15 mins, and there was a linear distribution between the $B_A$ and $B_B$. There were three component factors, $B_A$, $B_B$, and the location in the plot. Although the location of the data points is slightly inclined toward weaker $B_B$ values and more robust $B_A$ values after BSA modification and the conjugation of anti-BSA, it is still too complicated to evaluate the dataset from these coordinates. However, by applying the spectral image brightness contrast, $$\gamma = \frac{B_A - B_B}{B_A + B_B},$$

to the raw data, the dataset can be transferred to linearly uncorrelated variables, which are the counts (N) and $$\gamma = \frac{B_A - B_B}{B_A + B_B}$$

here, as shown in FIG. 3A. By redefining a new orthogonal coordinate system, the LSPR shifts of AuNPs are optimally described in a digital dataset. The brightness difference ($B_A$–$B_B$) between the selected wavelength bands indicates the analogous spectral contrast related to the LSPR peak shift. Normalization to ($B_A$+$B_B$) efficiently eliminates the intensity fluctuation from light scattering. The counts show the significant LSPR shift statistic distribution and help us study the variation of the dataset trends more straightforwardly.

Step S3: defining a positive threshold for |γ|≥0.1.

FIG. 3B shows the γ value distributions versus the AuNP counts, which exhibit a Gaussian distribution. It is found that with increase in surface-attached biomolecules (bare, BSA-modified, and then anti-BSA-conjugated), the γ values of most data points increased, and thus, the distribution shifted to a higher γ. This result is consistent with the principle of the LSPR immunoassay that protein binding induces a redshift of LSPR in resonant spectra, as depicted in FIG. 2B. However, there is still a slight difference between the conventional and digital LSPR analyses. In the traditional LSPR analysis, the readout is the average shift of the LSPR peak. For the detection method and system of the present disclosure, the readout is the frequency of positive detection, which signifies that more biomolecule binding induces more AuNPs to cross the LSPR threshold. Thus, the threshold set plays a critical role in digital analysis. In this embodiment, we set a cutoff at the upper 95% confidence interval (CI) of the $BSA_{100\%}$@AuNPs as the binary threshold to define a positive threshold. The upper 95% CI connotes that without the analytes (negative control, N.C.), 97.5% of the dataset lies outside the cutoff and presents as negative detection. In contrast, the remaining 2.5% of the dataset is considered the background ($N_0$). The readout would be the relative positive-detection count ($\Delta N/N_0$) increment following the attachment of analytes, as shown in the inset of FIG. 3B.

As described before, the readout in the detection method and detection system of the present disclosure is the positive-detection number of the immuno-agents, the AuNPs. To increase the sensitivity, the positive-detection number of AuNPs within limited objects of interest need be increased as much as possible. Therefore, the probe proteins modified onto the reporters (AuNPs) play a crucial role in the sensitivity of the digital analysis. Generally, when the probe protein ratio rises, each AuNP could provide more binding sites to the objects of interest. However, it might result in an uneven division of the limited objects of interest in the high probe ratio condition. Some AuNPs capture more objects of interest, while the others can only obtain fewer or none. In the detection method of the present disclosure, a minimum amount of objects of interest on the AuNPs is necessary to cross the threshold. An uneven distribution would result in a drop in the positive-detection counts. On the other hand, the very low probe protein ratio would result in insufficient binding sites on the AuNPs. These are barely detectable even if the binding sites are fully occupied with the analytes. There is a trade-off for the probe protein ratio on AuNPs to maximize the counts of the detection method of the present disclosure and optimize the sensitivity.

In the experiment, PEG-($NH_2$)$_2$ is used to adjust the probe protein ratio on AuNPs. PEG-($NH_2$)$_2$ is a flexible linear polymer that can be immobilized onto AuNPs via strong physisorption, similar to probe proteins. Meanwhile, the addition of PEG-($NH_2$)$_2$ can facilitate the stability of AuNPs in a complicated matrix. Tree ratios of BSA to PEG-($NH_2$)$_2$, 1:0, 1:4, and 1:9 in wt %, were modified on AuNPs (marked as $BSA_{100\%}$@AuNPs, $BSA_{20\%}$@AuNPs, and $BSA_{10\%}$@AuNPs, respectively. The BSA/PEG-modified AuNPs interacted with different concentrations of anti-BSA solution. The anti-BSA binding sensitivities and dynamic ranges were compared. As shown in FIG. 4A to FIG. 4C, the corresponding γ distributions before and after anti-BSA conjugation at various concentrations. It is found that the γ-distributions vary with the surface modifications on AuNPs. Increasing the ratio of PEG-($NH_2$)$_2$ led to a decreasing cutoff (upper 95% CI of N.C.). This is attributed to the addition of PEG-($NH_2$)$_2$ reducing the equivalent surface molecule weight and refractive index on AuNPs, which is consistent with the redshift results of the UV-Vis absorption peak. This result demonstrates the reliability of the detection method of the present disclose, in detecting the LSPR shift with different surface molecule absorptions on AuNPs.

The detection sensitivities were evaluated by detecting different concentrations of anti-BSA from 0 pg mL$^{-1}$ to 1 μg mL$^{-1}$. From the results displayed in FIG. 4D, the use of $BSA_{100\%}$AuNPs does not appear to have evident signal discrimination in detecting anti-BSA below 100 ng mL$^{-1}$. This is because of the uneven division of the limited objects of interest and consequently reduced positive-detection counts. Once the anti-BSA molecules are present in sufficient concentrations (>100 ng mL$^{-1}$), most AuNPs can bind sufficient objects of interest to cross the cutoff and result in a signal jump. For the $BSA_{10\%}$@AuNPs, despite an increase in the signal in correlation with the low anti-BSA concentration, the higher concentration gives rise to saturated binding on AuNPs. The saturation limits the detection dynamic range. In comparison, $BSA_{20\%}$@AuNPs exhibit excellent sensitivity and a large dynamic range from 1 pg mL$^{-1}$ to 1 μg mL$^{-1}$ (>six orders of magnitude) without saturation. It is noted that the data deviation in the repeated experiments increased with the amount of PEG-($NH_2$)$_2$. This result suggests the non-uniformity of the anchor protein distribution on AuNPs. The t-test results of $BSA_{20\%}$@AuNPs and $BSA_{10\%}$@AuNPs show a statistically significant difference between the N.C. (0 pg mL$^{-1}$) and 1 pg mL$^{-1}$. Considering the overall sensitivity, dynamic range, and standard deviation, $BSA_{20\%}$@AuNPs is used as immuno-agents for the detection method of the present disclosure.

Comparison of the detection method and system of the present disclosure with traditional LSPR immunoassays after optimization, the detection method and system of the present disclosure performance was compared with that of the traditional LSPR immunoassay, UV-Vis absorption spectra method, and naked-eye-based detection. First, it should be noted that with a limited objects of interest, a higher number of immuno-agents would lead to fewer objects of interest loading on each agent, reducing the LOD. Therefore, to optimize the LOD of these three methods, the minimal detectable AuNP concentrations of each method were tested, thereby maximizing their objects of interest-to-immuno-agent ratio. The minimal detectable concentration was 5×10$^9$ NP mL$^{-1}$ for the naked eye and 5×10$^8$ NP mL$^{-1}$ for the UV-V$_{is}$ absorption spectra and the present disclosure.

Please refer to FIG. 5A to FIG. 5E. In this embodiment, we demonstrated the present disclosure's reliability, quick response (15 mins), high sensitivity (LOD~1 pg mL$^{-1}$), and broad dynamics (>six orders of magnitude) in anti-BSA detection. Here, we further demonstrate the capability of the present disclosure in antibody detection against the spike protein of SARS-CoV-2, and the results are shown in FIG. 5A to FIG. 5E. According to the upper 95% CI of the SP per-modified 50-nm AuNPs ($SP_{20\%}$@AuNPs), the cutoff (positive threshold) was set to 0.255. As shown in FIG. 5A, using $SP_{20\%}$@AuNPs as the immune-agent, the shifts to larger γ values in the AuNP count versus γ distribution can be observed as the $mAb_{SP}$ increases (FIG. 5A). This results in an increasing AuNP count number that crosses the set cutoff. In contrast, the detection of anti-BSA, which was used as the specificity test, did not show any noticeable shift at a concentration of 100 ng mL$^{-1}$ or lower. Even though there was a jump at a concentration of 1 pg mL$^{-1}$, as shown in FIG. 5C, the signals of $mAb_{SP}$ at concentrations higher than 10 pg mL$^{-1}$ were still distinguishable. However, this result also suggests that sensitivity might fluctuate due to the matrix influence of the LSPR immunoassay. To clarify the matrix influence, we further used artificial saliva with and without spiked human antibodies to demonstrate detection in complicated samples.

Artificial saliva containing human serum albumin and multiple antibodies to mimic human saliva are provided as a complicated sample. The detection of increasing concentrations of $mAb_{SP}$ in mimicked human saliva (saliva buffer, S.B.) was then conducted. FIG. 5D, displays the result, where the blank is the artificial saliva without adding any proteins. As a complicated sample, the cutoff set according to the 95% CI of N.C. is larger than that in the pure sample (TE buffer, FIG. 5A, FIG. 5B). Additionally, the difference in $\Delta N/N_0$ between the blank and N.C. is approximately 1 pg mL$^{-1}$ of anti-BSA in FIG. 5C. This result is attributed to the matrix influence in the complicated sample. The matrix influence affects the LOD of the present disclosure. However, the approximate $\Delta N/N_0$ of the different additives (proteins) and base matrices indicate limited impact. From FIG. 5D, FIG. 5E, although the cutoff was raised, there was still an evidently increasing AuNP count that crossed the set cutoff as the $mAb_{SP}$ concentration increased. The apparent count discrimination from N.C. (0 pg mL$^{-1}$) demonstrates the outstanding capability of the present disclosure in detecting antibodies against the SARS-CoV-2 spike protein in saliva. It shows an LOD of 10 pg mL$^{-1}$ and a broad six-order-of-magnitude dynamic range at least. We attributed the LOD variation between anti-BSA and $mAb_{SP}$ detection to the specificity of antibodies and the matrix influence. Although the LOD raised in the complicated sample, the present disclosure shows the same LOD grade (10 pg mL$^{-1}$) as ELISA while the present disclosure is being label-free, much more accessible, and having a quicker readout time. It is noted that, as the results shown in FIG. 3B, FIG. 4A, FIG. 4B, FIG. 4C, FIG. 5A, FIG. 5B, FIG. 5D, large molecules such as anti-BSA, spike protient and the like, the cutoff (positive threshold) is γ≥0.1.

Please refer to FIG. 6A to FIG. 6D. As shown in FIG. 6A, small and large molecules bound on gold nanoparticles (AuNPs), where the $d_s$ indicates the thickness of the bound molecule layer, and $d_{NP}$ indicates the diameter of the AuNPs. It is noted that, small molecules refers to a molecular weight less than 500 Da and large molecules refers to a molecular weight larger than 10 kDa. FIG. 6B shows the normalized scattering cross-sections of AuNPs with 50 nm in diameter ($d_{NP}$) versus different $d_s$. The legend indicates the thickness of the bound molecule layer ($d_s$). FIG. 6C shows the responses comparison along with $d_{NP}$ by using the peak wavelength and spectral image contrast γ centered at 540 nm. For small molecules whose $d_{NP}$ is less than 0.5 nm, spectral image contrast γ shows better linearity, indicating the spectral image contrast shows a better performance in small molecules, the pesticide detection. FIG. 6D shows AuNPs have a ±5 nm in diameter variation because of 10% of the coefficient of diameter variation. Theoreticaly, the cutoff γ at $d_s$=0 is positive relative to the diameter of AuNPs, i.e., smaller γ represents a smaller AuNP. Furthermore, according to the calculation, smaller AuNPs would present an intense γ increase rate along with increasing $d_s$. This phenomenon plays a critical role in small molecule detection. It indicates that when employing the detection method and system of the present disclosure, setting a cutoff at the lower limit (LL, the left side of the γ distribution) could have an intense count change rate and better sensitivity in pesticide detection.

As shown in FIG. 7A and FIG. 7B, for applying imidacloprid detection to the detection method and system of the present disclosure, the cutoff set at the 95% lower limit (LL) of the confidence interval (CI) shows a gradual decrease along with the pesticide concentration increases. FIG. 7B shows based on the 95% LL decrease rate and the use of the odorant-binding-protein-2 modified AuNPs, this disclosure provides a significant sensitivity in neonicotinoids and evidently selectivity from other classes of pesticides, such as acephate and fipronil. It is noted that as the results shown in FIG. 7A and FIG. 7B, small molecules such as imidacloprid and the like, the cutoff (positive threshold) is −γ≥0.1.

Please refer to FIG. 8A and FIG. 8B. A blind test results of green tea are shown in FIG. 8A and showing the cutoff was set as three times the standard deviation of blank samples containing no pesticides. The blind test results in FIG. 8A is consistent with the standard method-ESI-mass spectrometry result as listed in the box charts in FIG. 8B. This consistency demonstrated a significant selectivity between neonicotinoids and other classes of pesticides by using the odorant binding protein 2 and flow digital nanoplasmon-metry. This result validates the capability of this closure in multiple pesticide detection.

As shown in FIG. 8C and FIG. 8D, a blind test results of black tea are shown in FIG. 8C and showing the cutoff was set as three times the standard deviation of blank samples containing no pesticides. The blind test results in FIG. 8C is consistent with the standard method-ESI-mass spectrometry result as listed in the box charts in FIG. 8D. This consistency demonstrated a significant selectivity between neonicotinoids and other classes of pesticides by using the odorant binding protein 2 and flow digital nanoplasmon-metry. This result validates the capability of this closure in multiple pesticide detection.

Figure 2I:
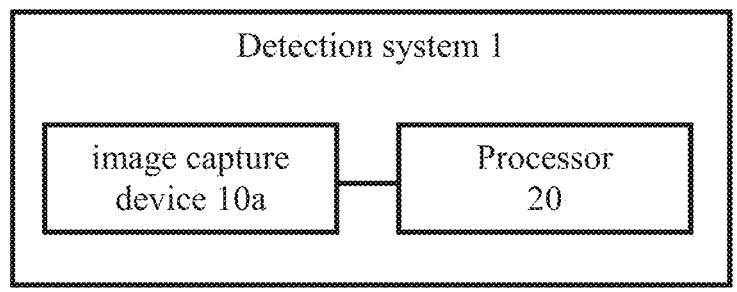
FIG. 2I illustrates a hardware structure of one embodiment of the detection system.

Please refer to FIG. 2I, the detection system 1 including an image capture device 10a and a processor 20 electrically connected to the image capture device 10a. The image capture device 10a is for obtaining a plurality of local surface plasmon resonance (LSPR) spectral images of each of the plurality of the reporters individually, wherein each of the LSPR spectral images has a brightness of a long wavelength band ($B_A$) and a brightness of a short wavelength band ($B_B$). The processor 20 calculates a spectral image brightness contrast γ for each of the reporters, $$\gamma = \frac{B_A - B_B}{B_A + B_B}$$

and the processor defines a positive threshold for |γ|≥0.1. According to one embodiment of the present disclosure, the image capture device 10a is a camera installed in a handheld device, such as a camera equipped in a smart phone.

It should be noted that many of the above-mentioned embodiments are given as examples for description, and the scope of the present invention should be limited to the scope of the following claims and not limited by the above embodiments.

What is claimed is:

1. A detection method for detecting objects of interest attached to a surface of a plurality of reporters, comprising:
    illuminating, by a light source, the plurality of reporters flowing in a microfluidic chip;
    obtaining, by an image sensor, a plurality of local surface plasmon resonance (LSPR) spectral images of each of the plurality of the reporters individually, wherein each of the LSPR spectral images has a brightness of a long wavelength band ($B_A$) and a brightness of a short wavelength band ($B_B$);
    calculating, by a processor, a spectral image brightness contrast y for each of the reporters to amplify a spectral shift caused by the reporters and thereby enhance detection sensitivity, wherein $\gamma=(B_A-B_B)/(B_A+B_B)$;
    calculating, by a processor, an absolute value |γ| of each of the spectral image brightness contrast γ; and
    determining, by a processor, whether each of absolute value |γ| satisfies a defined positive threshold for |γ|>0.1.

2. The detection method as claimed in claim 1, wherein when a molecular weight of the objects of interest is larger than 10 kDa, the positive threshold is γ>0.1.

3. The detection method as claimed in claim 1, wherein when a molecular weight of the objects of interest is less than 500 Da, the positive threshold is -y>0.1.

4. The detection method as claimed in claim 1, wherein the long wavelength band and the short wavelength band are divided by a peak of a LSPR spectral image of the reporter before being shifted.

5. The detection method as claimed in claim 4, wherein the peak of a LSPR spectral image of the reporter before being shifted is X nm, the long wavelength band is defined as (X+10)=10; the short wavelength band is defined as (X-10)=10.

6. The detection method as claimed in claim 1, wherein before defining the positive threshold, the method further comprising: defining a diagram of each of the spectral image brightness contrast y and a counting number of the reporters corresponding to each of the spectral image brightness contrast y.

7. The detection method as claimed in claim 1, wherein the objects of interest attached to the surface of a plurality of reporters vis a plurality of immuno-agents, and a concentration of the plurality of immuno-agents is 20%.

8. The detection method as claimed in claim 7, wherein the light source is a dark-field illumination system.

9. A detection system for detecting objects of interest attached to a surface of a plurality of reporters, comprising:
    a light source for illuminating the plurality of reporters flowing in a microfluidic chip;
    an image capture device, electrically connected to the image capture device, configured for obtaining a plurality of local surface plasmon resonance (LSPR) spectral images of each the plurality of the reporters individually, wherein each of the LSPR spectral images has a brightness of a long wavelength band ($B_A$) and a brightness of a short wavelength band ($B_B$);
    a processor for calculating a spectral image brightness contrast y for each of the reporters to amplify a spectral shift caused by the reporters and thereby enhance detection sensitivity, wherein $\gamma=(B_A-B_B)/(B_A+B_B)$, calculating an absolute value |γ| of each of the spectral image brightness contrast γ, and then determining whether each of the absolute value |γ| satisfies defining a defined positive threshold for |γ|>0.1.

10. The detection system as claimed in claim 9, wherein when a molecular weight of the objects of interest is larger than 10 kDa, the positive threshold is γ=0.1.

11. The detection system as claimed in claim 9, wherein when a molecular weight of the objects of interest is smaller than 500 Da, the positive threshold is -y>0.1.

12. The detection system as claimed in claim 9, wherein the long wavelength band and the short wavelength band are divided by a peak of a LSPR spectral image of the reporter before being shifted.

13. The detection system as claimed in claim 12, wherein the peak of a LSPR spectral image of the reporter before being shifted is X nm, the long wavelength band is defined as (X+10)±10; the short wavelength band is defined as (X−10)±10.

14. The detection system as claimed in claim 9, wherein before defining the positive threshold, the method further comprising:
    defining a diagram of each of the spectral image brightness contrast y and a counting number of the reporters corresponding to each of the spectral image brightness contrast y.

15. The detection system as claimed in claim 9, the objects of interest attached to the surface of a plurality of reporters via a plurality of immuno-agents, and a concentration of the plurality of immuno-agents is 20%.

16. The detection system as claimed in claim 15, wherein the light source is a dark-field illumination system.

17. The detection system as claimed in claim 9, wherein the image capture device is a camera installed in a hand-held device.

* * * * *